United States Patent Office 3,816,406
Patented June 11, 1974

3,816,406
O-ARYL OXIMES OF 3-KETO STEROIDS
Allen Frederick Hirsch, Somerville, N.J., assignor to Ortho Pharmaceutical Corporation, Raritan, N.J.
No Drawing. Filed Mar. 19, 1973, Ser. No. 342,903
Int. Cl. C07c 173/10
U.S. Cl. 260—239.5          4 Claims

ABSTRACT OF THE DISCLOSURE

O-aryl oximes of 3-keto steroids are described. The O-aryl oximes are active as post-coital agents for the suppression of reproduction in mammals.

---

The present invention relates to O-aryl oximes of 3-keto steroids which have post-coital activity for the suppression of reproduction. In addition to the antilittering activity, the O-aryl oximes exhibit anabolic activity and are weak androgenic agents.

The compounds of this invention are defined by the following formula:

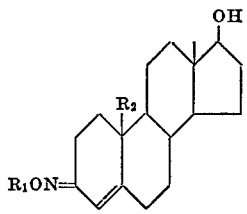

wherein $R_1$ is pyridyl or phenyl and $R_2$ is hydrogen or methyl.

The precursor ketones of these antilittering agents are generally ineffective as such while the parent oximes are either ineffective or substantially less effective as antilittering agents than the O-aryl oximes.

The major disadvantage of most of the presently available commercial methods of contraception is that they must be employed prior to coitus. This is true not only of oral anti-ovulatory contraceptives and anti-implantive intrauterine devices, but of condoms, spermacidal foams and jellies, diaphragms and the like as well. Thus, forethought and preparation are required prior to coitus, if any of these contraceptive methods is to be employed. In addition, the above noted contraceptive methods are either inconvenient, as in the case of diaphragms, intrauterine devices and the like, or are potentially harmful as in the case of some oral anti-ovulatory compounds. The currently used oral contraceptives generally contain significant amounts of estrogen which may produce harmful side effects such as thrombophlebitis and pulmonary embolism. Intrauterine devices can cause perforation of the uterus on insertion and can be painful to the user not only during insertion, but also during residency. By means of the present invention, a method for suppressing reproduction is provided which requires no prior preparation and does not possess the disadvantages of the prior art methods.

The compounds which are the subject of this invention can be prepared by reacting the oxime of the parent keto steroid with an aryl halide in the presence of a suitable base, such as sodium hydride, for example. Alternatively, the compounds can be prepared by reacting the parent keto steroid with the appropriate arylhydroxylamine hydrochloride in the presence of a mild base such as sodium acetate. The parent ketones are well known in the art as are the methods of their preparation.

The O-aryl oximes exhibit post-implantive antilittering properties when administered to rats on days 9–12 after coitus.

The compounds of this invention can be prepared as follows:

EXAMPLE I 3-(2'-pyridyloxy)imino-estr-4-en-17β-ol

A mixture of 10 g. of 19-nortestosterone oxime, 1.70 g. of 57% sodium hydride and 150 ml. of tetrahydrofuran is stirred under nitrogen until the evolution of hydrogen ceases. A solution of 2-fluoropyridine (3.38 g.) in 50 ml. of dimethylsulfoxide is added and the resultant mixture is stirred for 5 days under nitrogen. The solution is then poured into water, filtered and dried. The crude solid is then put onto a Silicar CC–7 column and is eluted with 10% acetone in chloroform. The solvent is removed and the residue is crystallized from ether to afford 2.2 g. of 3-(2'-pyridyloxy)imino-estr-4-en - 17β - ol, M.P. 128.5°–131° C.

EXAMPLE II 3-phenoxyimino-estr-4-en-17β-ol

To a solution of 1.38 g. of 19-nortestosterone in 25 ml. of ethanol is added a solution of 0.73 g. of O-phenyl hydroxylamine hydrochloride and 0.41 g. of sodium acetate in 10 ml. of water and 20 ml. of ethanol. The resulting solution is stirred at room temperature for five minutes. The precipitate which forms is filtered off and recrystallized from ethanol to afford 600 mg. of 3-phenoxyimino-estr-4-en-17β-ol, M.P. 155–157° C.

EXAMPLE III 3-(2'-pyridyloxy)imino-androst-4-en-17β-ol

To a solution of 6.06 g. of testosterone oxime and 0.96 g. of sodium hydride in 40 ml. of tetrahydrofuran is added 60 ml. of dimethylsulfoxide. The resulting solution is refluxed with stirring for 20 minutes after which a solution of 1.94 g. of 2-fluoropyridine in 20 ml. of dimethylsulfoxide is added. The solution is refluxed for two hours and then poured into water. The precipitate which forms is filtered, dissolved in dichloromethane and the solution is dried over drierite. The solution is concentrated to a solid residue. The crude solid is chromatographed on a Silicar CC–7 column and is eluted with chloroform. The solvent is removed and the residue is crystallized from hexane to afford 1.50 g. of 3 - (2' - pyridyloxy)imino-androst-4-en-17β-ol, M.P. 89–91° C.

The antilittering activity of the novel steroids is measured as follows:

Adult female rats are smeared daily and at the period immediately preceding estrus (proestrus) they are caged overnight with male rats of proven fertility. On the following morning, the females are examined for the presence of sperm in their vaginaal washings. The day on which sperm are found constitutes the first day of pregnancy (day 1). The rats are dosed with the test compound dissolved in sesame oil by gavage on day 9 through the twelfth day of pergnancy and are sacrified on the twenty-first day. The uteri are then examined for evidence of resorbtion. A control group is similarly treated except that the compound is not administered.

The following table illustrates the percentage of resorption obtained at the indicated dosage levels. The activity of the parent ketone and the unsubstituted oxime are also noted.

| Compound | Dosage level, mg./kg. | Percent resorptions |
|---|---|---|
| Example 1 | 40 | 100 |
| Parent ketone | 40 | 20.6 |
| Oxime | 20 | 39.5 |
| Example 2 | 20 | 100 |
| Parent ketone | 40 | 20.6 |
| Oxime | 20 | 39.5 |
| Example 3 | 40 | 75.9 |
| Parent ketone | 40 | 8.2 |
| Oxime | 40 | 66.7 |

What is claimed is:
1. A compound of the formula:

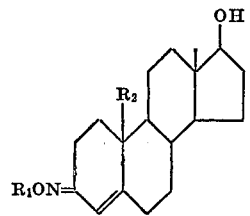

wherein $R_1$ is pyridyl or phenyl and $R_2$ is hydrogen or methyl.
2. 3-(2'-pyridyloxy)imino-estr-4-en-17β-ol.
3. 3-(phenoxy)imino-estr-4-en-17β-ol.
4. 3-(2'-pyridyloxy)imino-androst-4-en-17β-ol.

References Cited
UNITED STATES PATENTS

| | | | |
|---|---|---|---|
| 3,271,426 | 9/1966 | Villani | 260—397.5 |
| 3,299,107 | 1/1967 | Mazur | 260—397.5 |
| 3,507,888 | 4/1970 | Klimstra | 260—397.3 |

HENRY A. FRENCH, Primary Examiner

U.S. Cl. X.R.
260—397.5, 999